United States Patent Office 3,068,243
Patented Dec. 11, 1962

3,068,243
2-KETO-Δ$^{3,(5)}$ A-NORCORTISONES
John M. Chemerda, Metuchen, and Ralph F. Hirschmann, Scotch Plains, N.J., assignors to Merck & Co., Inc., Rahway, N.J., a corporation of New Jersey
No Drawing. Filed July 6, 1959, Ser. No. 824,923
5 Claims. (Cl. 260—340.9)

This application is a continuation-in-part of our pending application Serial No. 778,281, filed December 5, 1958, now abandoned.

This invention relates generally to processes for the manufacture of certain novel steroid compounds useful in production of physiologically active steroids, and the compounds thereby obtained. More particularly it is concerned with processes for making intermediates and also a certain novel final product that may be possessed of anti-inflammatory activity, useful in treating androgen deficiencies, uterine disorders, corpus luteum hormone deficiencies and that may have anabolic activity.

A characteristic of all of these steroid compounds according to this invention, whether intermediates in the synthesis of other steroids or those that are per se physiologically active, is that in each instance the A-ring of the steroid molecule is modified, whether by substituents or otherwise, from the normal or characteristic A-ring of conventional steroids. Among the novel A-ring modified steroids according to the present invention which may be therapeutically useful per se, in addition to being useful in the synthesis of other steroids, is A-norcortisone.

In accordance with this invention it is found that certain 3-keto-Δ$^{1(2),4(5)}$ steroids can be reacted with osmium tetraoxide in an organic solvent medium, such as pyridine, to produce an osmate ester which can be decomposed by treatment with a reducing agent to yield a steroid retaining an α,β-unsaturated ketone system in the 3,4-5 positions and bearing a hydroxyl group of uncertain configuration in each of the 1 and 2 positions. In accordance with this invention it is found further that this reaction product can be subjected to dehydration by an alkali metal alkoxide of a lower alkanol in a lower alkanol solution to yield the alkali metal derivative of the corresponding 2-hydroxy-3-keto-Δ$^{1(2),4(5)}$ steroid.

In accordance with this invention it is further found that this alkali metal steroid derivative may be reacted with an alkyl halide to produce a 2-alkoxy steroid, or it may be treated with a dilute aqueous alkali metal hydroxide solution at an elevated temperature, say on a steambath, followed by acidification to effect formation of a mixture of two 2ξ-hydroxy-2ξ-carboxy steroids, one of which is a 2ξ,5ξ-dihydroxy-2ξ-carboxy-A-nor-pregnane and the other of which is 2ξ-hydroxy-2ξ-carboxy-Δ$^5$-A-nor-pregnene. According to a still further aspect of this invention, the mixture of 2-hydroxy-2-carboxy compounds or either compound after separation from the other is converted to a steroid having a keto group in the 2-position by treating the selected compound or mixture with lead tetraacetate in an organic solvent medium such as a mixture of benzene and methanol and then contacting the reaction product to produce a 2-keto-Δ$^{3(5)}$-A-norpregnene by treatment with a dilute solution of a strong acid or a strong base to yield the desired product or products.

It will be understood by those skilled in the art to which this invention relates that in the aforesaid reactions certain groups that may be present in the steroid may be protected to prevent them from entering into reaction with production of undesired co-products. For example, a keto group, if present in the 20-position, may be protected by initial reaction of the steroid starting material with ethylene glycol to produce the corresponding ketal. Likewise, a steroid having hydroxyl groups in the 17 and 21-positions may be protected by initially forming the 17-20,20-21-bismethylenedioxy derivative. It will be evident to those skilled in the art to which this invention relates that the processes of this invention may be employed effectively to produce novel steroids variously substituted in the positions not directly involved in the reaction herein described. It also will be evident that intermediates produced in the course of these reactions may be subjected to other reactions for product of physiologically active steroids other than those specifically mentioned herein.

To facilitate a fuller and more complete understanding of the subject matter of this invention, a specific example herewith follows but it is clearly to be understood that this example is provided by way of illustration merely and is not to be construed as imposing limitations upon the scope of the invention defined in the subjoined claims.

EXAMPLE

Synthesis of A-Norcortisone

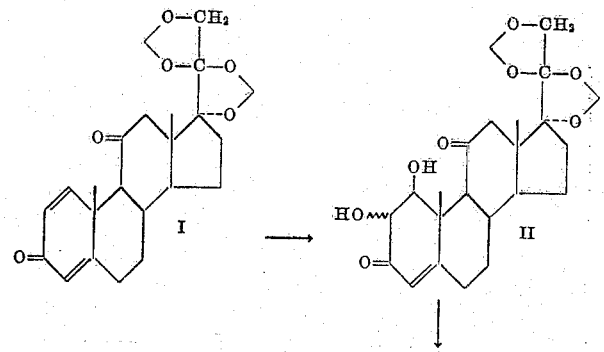

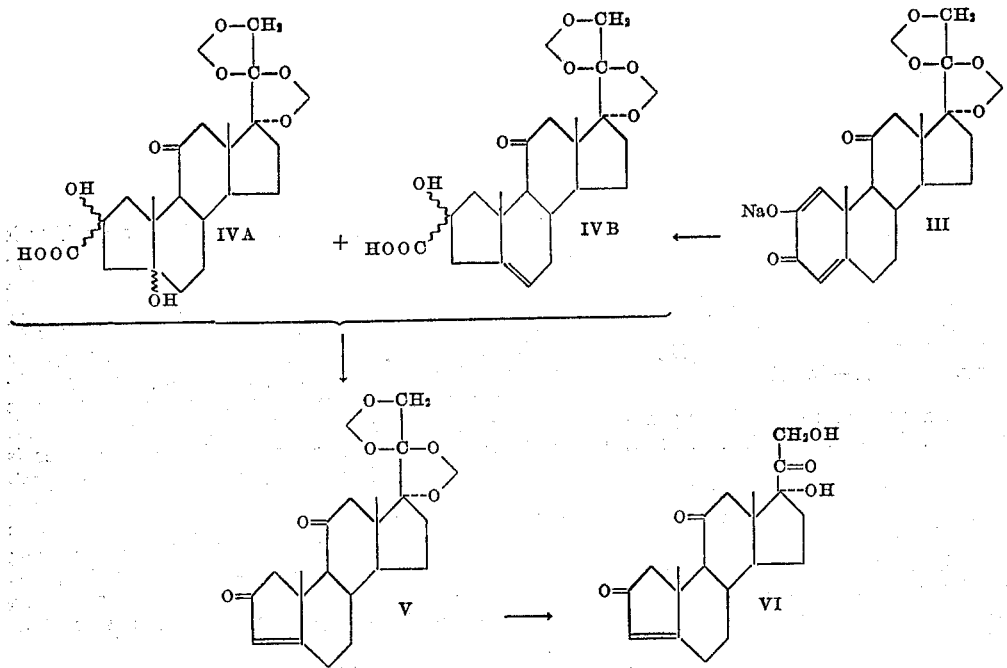

A solution of 100 grams of prednisone bismethylenedioxy derivative I (the 17-20,20-21-bismethylenedioxy derivative of $\Delta^{1,4}$-pregnadiene-17α,21-diol-3,11,20-trione) in 720 milliliters of pyridine is cooled to 5° C. and treated with a solution of 69.9 grams of osmium tetraoxide in 408 milliliters of pyridine. The mixture, which turns black within about five minutes, is allowed to stand at room temperature for five days when it is added with stirring to 13.4 liters of petroleum ether. The crude osmate ester is isolated by filtration and washed with petroleum ether to remove most of the residual pyridine. The crude product is then dissolved in 8 liters of dioxane and kept in an icebath while a slow stream of hydrogen sulfide is bubbled through the reaction mixture. The precipitated osmium dioxide is removed by filtration, and the filtrate is concentrated to dryness in vacuo. The residual foam is dissolved in 2 liters of acetone, decolorized with activated carbon, filtered and concentrated to a volume of 1 liter. Addition of 1 liter of Skellysolve B affords 38 grams of The 17,20-20,20-bismethylenedioxy derivative of 1ξ,2ξ-dihydroxy-cortisone II, $\lambda_{max}^{CH_3OH}$ 236 mμ (log E 4.15)

$\lambda_{max}^{CH_3}$ 2.85μ, 5.95μ, 6.15μ shoulder at 5.85–5.90μ, max. 9–9.2μ.

When inserted into a melting point bath at 200° C., the compound is found to undergo a change in crystal structure and melted at 232°–234° C., which does not involve a dehydration to compound III as shown by paperstrip chromatography. The mother liquor affords two further crops, melting at 228°–230° C., amounting to 3.48 grams and 10.55 grams, respectively. Further recrystallization of the first crop from the same solvent pair raises the melting point to 244°–245° C. (70% recovery). An analytical sample is obtained by paper chromatography using methanol formamide (2:1) as the stationary phase and chloroform as the mobile phase. Isolation by crystallization from acetone Skellysolve B does not give a sample of improved melting point.

*Anal.*—Calcd. for $C_{27}H_{30}O_8 \cdot C_3H_6O$: C, 63.40; H, 7.37. Found: C, 63.84; H, 7.35.

The compound gives a positive tetrazolium test and a negative ferric chloride test. The extinction of the former is found to be about two-thirds that given by cortisone free alcohol.

To a solution of 3.09 grams of the above glycol II in 75 milliliters of hot methanol is added 52 milliliters of a solution of sodium methoxide in methanol (0.14 N). The mixture is heated on a steambath until a tetrazolium test is essentially negative. The bulk of the methanol is removed in vacuo, about 250 milliliters of ether is added and the product is isolated by filtration, affording 3.15 grams of a very hydroscopic solid.

$\lambda_{max}^{0.1NNaOH}$ 226 mμ (log E 4.18) 352 mμ (3.41)

shoulder at 252 mμ (3.86):

$\lambda_{max}^{CHCl_3}$ 5.86μ, 6.05μ, 6.2μ, 6.32μ, 9.05–9.2μ

This substance is the sodio-derivative of the 17-20,20-21-bismethylenedioxy derivative of 2-hydroxy-$\Delta^{1,2}$-cortisone.

In another experiment (14.5-gram scale), treatment of the glycol II with a 5% excess of sodium methoxide affords 11.39 grams of the sodio-derivative III. The latter sample is dried at 100° C. for two hours, resulting in a weight loss of 8%.

*Anal.*—Calcd. for $C_{23}H_{27}O_7Na \cdot (H_2O)_{\frac{1}{2}}$; C, 61.73; H, 6.31; Na, 5.14. Found: C, 61.94; H, 6.39; Na, 4.93.

This preparation is found to decompose to a large extent on standing at room temperature for three months. In methanol the sodium salt shows the characteristic ultraviolet absorption pattern of the free compound (λ max. 252 mμ, infl. 292 mμ).

A mixture of 5.05 grams of the above sodio-derivative III is heated on a steambath overnight in a nitrogen atmosphere with 240 milliliters of a 1.55 N aqueous solution of sodium hydroxide. The solution is acidified in the cold, the resulting acid extracted into ethyl acetate and washed with a saturated salt solution. The acid is purified via its sodium salt by extraction into sodium bicarbonate followed by reacidification and extraction into ethyl acetate. Removal of the solvent gives an amorphous solid which is decolorized with activated carbon and crystallized from acetone Skellysolve B. This product is a mixture of compounds represented by formulae IVA and IVB of uncertain configuration at the 2-position. These compounds are separated by fractional crystallization. The initial crystalline crop melts at 197°–199.5°

C. (dec.). Further recrystallization from methanol-water and then from acetone Skellysolve B gives the colorless, analytically pure acid, melting point 202°–203° C., $[\alpha]_D^{Py}$ —75.5°. For convenience hereinafter this compound is referred to as compound IVA.

*Anal.*—Calcd. for $C_{23}H_{32}O_9$: C, 61.05; H, 7.13. Found: C, 60.91; H, 7.03.

The mother liquor from the initial crystallization of compound IVA is taken to dryness. Dissolution in acetone is followed by the addition of Skellysolve B, gave only a red oil. The supernatant liquor is separated by decantation and affords, after the addition of more Skellysolve B, a crystalline solid, compound IVB, melting at about 220° C. Repeated recrystallization from the same solvent pair gives an analytical sample, melting at 250°–252° C., $[\alpha]_D^{Py}$ —98.3°.

*Anal.*—Calcd. for $C_{23}H_{30}O_8$: C, 63.58; H, 6.96. Found: C, 63.63; H, 6.89.

In another experiment, 2.0 grams of the sodio-derivative III is suspended in a solution of 38.6 grams of barium hydroxide in 265 milliliters of water and heated on a steambath with vigorous stirring in a nitrogen atmosphere overnight. The mixture is filtered, the filtrate made acid to Congo red and the acid extracted with ethyl acetate. The A-nor acid is purified via its sodium salt as described above. Crystallization from acetone Skellysolve B gives compound IVB, melting at about 240°–245° C.

A 2.65 gram sample of the glycol, compound II, is dissolved in 35 milliliters of methanol, 5 milliliters of a 2.5 N aqueous solution of sodium hydroxide is added and the mixture is refluxed for about three minutes (negative tetrasodium test), then the bulk of the solvents is removed in vacuo. The residue, which is insoluble in water, is acidified with hydrochloric acid, the diosphenol reaction product is extracted into ethyl acetate and the resulting solution is washed twice with a saturated salt solution. An aliquot is taken to dryness to afford the crude diosphenol, $\lambda_{max.}^{CH_3OH}$ 252 m$\mu$ (log E 4.05), infl. 292 m$\mu$ (3.43)

Addition of one drop of 2.5 N aqueous sodium hydroxide solution per 10 milliliters of solution is found to produce a marked change in the spectrum: $\lambda$ max. 226 m$\mu$ (log E 4.24), 345 m$\mu$ (3.23), infl. 250 m$\mu$ (3.89); this change can be reversed with acid.

The bulk of the organic layer, which still contains mineral acid, is repeatedly extracted with a dilute solution of sodium hydroxide, causing the sodium salt of the diosphenol compound III to separate at the interface. The combined solids are heated on a steambath with 300 milliliters of 1.1 N aqueous sodium hydroxide overnight. The isolation of the A-nor-acid compound IVA, melting at 197°–200° C., is carried out essentially as described above. The bicarbonate insoluble fraction from the benzilic acid rearrangement is washed free of bicarbonate, dried over magnesium sulfate and taken to dryness to give a brown solid showing a strong ferric chloride test;

$\lambda_{max.}^{CH_3OH}$ 315 m$\mu$ (log E 3.69), infl. 235 m$\mu$ (3.57);

227 m$\mu$ (3.77)

After separation of the interface-solids from the dehydration step, as described above, the ethyl acetate layer is washed until neutral, dried and taken to dryness. The residue, which leaves no residue on burning, is shown to be the free diosphenol on the basis of its ultraviolet absorption spectrum. In the infrared it shows:

$\lambda_{max.}^{Nj}$ 2.99$\mu$, 5.85$\mu$, 6.07$\mu$ $\lambda_{max.}^{CHCl_3}$ 2.9$\mu$ 8.85$\mu$, 5.96$\mu$, 6.08$\mu$, 6.18$\mu$, 9.–9.2$\mu$ Compound IVA, the 17-20,20-21-bismethylenedioxy derivative of 2$\xi$-carboxy-2$\xi$,5$\xi$,17$\alpha$,21-tetrahydroxy-A-nor-pregnane-11,20-dione and compound IVB, the 17-20,20-21-bismethylenedioxy derivative of 2$\xi$-carboxy-2$\xi$,17$\alpha$,21-trihydroxy-A-nor-5-pregnene-11,20-dione may be utilized hereinafter in the process of this invention as a mixture of compounds IVA, IVB or either compound, after separation from the other, may be used.

To a solution of 150 milligrams of compound IVB (melting point 238°–240° C.) in a mixture of benzene and 20 milliliters of methanol is added 500 milligrams of lead tetraacetate. The mixture is allowed to stand at room temperature overnight. The bulk of the solvents is removed in vacuo and the residue is distributed between ether-benzene (3:2) and water. The aqueous layer is back-extracted with benzene and the combined organic layers are extracted with an aqueous bicarbonate solution and then with a saturated solution of sodium chloride. The crude intermediate product, 17$\alpha$-20,20-21-bismethylenedioxy-$\Delta^{5(6)}$-A-nor-pregnene-2,11-dione, contains only a small amount of the conjugated ketone as evidenced by log E=3.45 at 228 m$\mu$. Addition of a dilute solution of sodium methoxide immediately raised the log E to 4.12. An aliquot (75 milligrams) is, therefore, dissolved in 15 milliliters of methanol and isomerized for two hours by the addition of 1.5 milliliters of a 0.86 N solution of sodium methoxide in methanol. Neutralization with acetic acid, removal of the solvent and addition of water gives about 55 milligrams of crude compound VB, 17-20,20-21-bismethylenedioxy-A-norcortisone, i.e., the 17-20,20-21-bismethylenedioxy derivative of 17$\alpha$,21-dihydroxy-A-nor-3-pregnene-2,11,20-trione. An analytical sample, melting at 208°–212° C., $\lambda$ max. 229 m$\mu$ (log E 4.16);

$\lambda_{max.}^{Nj}$ 5.86$\mu$, 5.94$\mu$ (shoulder), 6.11$\mu$ $\lambda_{max.}^{CHCl_3}$ 5.85$\mu$, 5.93$\mu$, 6.11$\mu$ may be prepared from acetone-Skellysolve B.

*Anal.*—Calcd. for $C_{22}H_{28}O_6$: C, 68.02; H, 7.27. Found: C, 68.14; H, 7.00.

A solution of 160 milligrams of this compound V in 58 milliliters of dilute acetic acid (50% v./v.) is heated on a steambath for about fourteen hours. The mixture is poured on ice and extracted with chloroform. Removal of the solvent and crystallization from acetone-Skellysolve B gives crude compound VI which is purified further by paper chromatography on Whatman paper #4 using methanol formamide (1:1) as the stationary phase and chloroform as the mobile phase. An analytical sample melting at about 200° C., max. 229 m$\mu$ (log E 4.12) is obtained from acetone-Skellysolve B.

*Anal.*—Calcd. for $C_{20}H_{26}O_5$: C, 69.34; H, 7.56. Found: C, 69.07; H, 7.35.

The lead tetraacetate oxidation is carried out on a 300-milligram scale on the lower-melting compound IVA (melting point 198°–200° C.) as described above for compound IVB. The crude reaction product, 17$\alpha$-20,20-21-bismethylenedioxy - $\Delta^{5(6)}$ - A - nor - pregnene - 2,11-dione, shows limited absorption (log E 3.37) at 228 m$\mu$. Treatment of 75 milligrams of this intermediate dissolved in 15 milliliters of methanol for two hours with 1.5 milliliters of a 0.86 N solution of sodium methoxide in methanol effects dehydration of the 5-hydroxyl substituent and gives the desired final product, compound V. $\lambda$ max. 128 m$\mu$ (log E 4.14).

Hydrolysis of 160 milligrams of compound V as described above gives substantially pure compound VI. One recrystallization from acetone-Skellysolve B gives the product of formula VI above, melting at 207°–210° C., identical with the specimen first described above obtained from compound IVB. This product, A-norcortisone, is closely related to cortisone in chemical structure and properties.

Having thus described the subject matter of this inven- tion, what it is desired to secure by Letters Patent of the United States is:

1. A compound represented by the formula

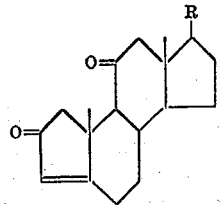

wherein R is a divalent oxygen-containing organic radical selected from the group consisting of the radical of the formula

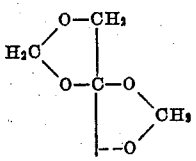

and the radical of the formula

2. A compound represented by the formula

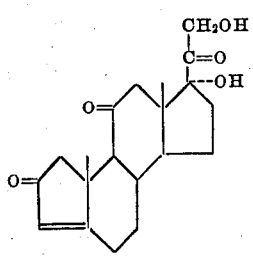

3. A compound represented by the formula

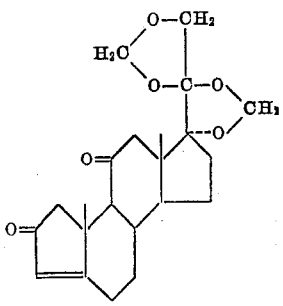

4. In a process for producing A-norcortisone the steps that comprise treating the 17-20,20-21-bismethylenedioxy derivative of 2ξ-carboxy-2ξ,5ξ,17α,21-tetrahydroxy-A-norpregnane-11,20-dione with lead tetraacetate to recover the desired 2-keto-A-nor steroid from the reaction mixture.

5. In a process for producing A-norcortisone the steps that comprise treating the 17-20,20-21-bismethylenedioxy derivative of 2ξ-carboxy-2ξ,17α,21-trihydroxy-A-nor-5-pregnene-11,20-dione with lead tetraacetate to recover the corresponding 2-keto-$\Delta^{3(5)}$-A-nor-steroid from the reaction mixture.

References Cited in the file of this patent
UNITED STATES PATENTS

| | | |
|---|---|---|
| 2,782,212 | Heusser et al. | Feb. 19, 1957 |
| 2,866,799 | Beyler et al. | Dec. 30, 1958 |
| 2,883,424 | Wildi | Apr. 21, 1959 |

OTHER REFERENCES

Allinson et al.: Nature, vol. 175, pages 720–1 (1955).